United States Patent [19]

Taylor

[11] 4,175,806
[45] Nov. 27, 1979

[54] RADIUS ROD OR ROCKER ARM BUSHES

[76] Inventor: Gordon J. Taylor, 18 Seng St., Graceville, Queensland, Australia, 4075

[21] Appl. No.: 894,109

[22] Filed: Apr. 6, 1978

[30] Foreign Application Priority Data

Apr. 6, 1977 [AU] Australia ............................... PC9702

[51] Int. Cl.² ........................................... F16C 27/00
[52] U.S. Cl. .............................. 308/238; 267/57.1 A
[58] Field of Search ........................ 267/53, 63, 57.1; 308/21, 238, 237, 2 R, 2 A, 26; 248/358 R

[56] References Cited

U.S. PATENT DOCUMENTS

| | | | |
|---|---|---|---|
| 3,006,627 | 10/1961 | Paulsen | 267/57.1 A |
| 3,130,991 | 4/1964 | Piragino | 308/238 X |
| 3,133,769 | 5/1964 | Drake | 308/238 X |

FOREIGN PATENT DOCUMENTS 1425066  2/1969  Fed. Rep. of Germany ........... 308/238

Primary Examiner—Douglas C. Butler
Attorney, Agent, or Firm—Donald D. Jeffery

[57] ABSTRACT

A bush assembly for a radius rod or rocker arm includes an eye at an end of the rod or arm oscillatable on a pin the ends of which are engaged in a bracket, a pair of resilient outer bushes being engaged on a pair of tubular outer spacers on the pin and in openings in the bracket, and a pair of resilient inner bushes being engaged on a pair of tubular inner spacers on the pin and in the eye of the rod or arm, the inner bushes being frictionally bonded to the eye and to the inner spacers, which are freely rotatable on the pin.

5 Claims, 4 Drawing Figures

4,175,806

RADIUS ROD OR ROCKER ARM BUSHES

BACKGROUND OF THE INVENTION

This invention relates to radius rod or rocker arm bushes, and more particularly to bushes of this type used in vehicle suspensions.

Hitherto it has been the practice to bush a radius rod, for example, to a radius rod pin by means of a pair of oppositely arranged coned inner bushes of rubber firmly engaged and frictionally bonded in opposite ends of a correspondingly shaped aperture through an eye at an end of the radius rod, these bushes being firmly engaged and frictionally bonded on a pair of tapered tubular spacers, usually of cast iron, fitted, and clamped against rotation, on the radius rod pin, the outer ends of the inner bushes abutting against peripheral flanges about the middle parts of the spacers. Outwardly of these flanges, there are also fitted on the spacers a pair of outer bushes, also of rubber and inwardly tapered to fit closely and bond frictionally in correspondingly coned coaxial openings in a bracket on the vehicle chassis, the outer ends of the outer bushes abutting against end plates or flanges formed on or clamped to the spacers. The resilience of the inner and outer bushes permits a degree of oscillation of the radius rod relative to the fixed bracket without sliding friction. However, in cases where the vehicle suspension system is subjected to rough usage, the frictional bonds may be insufficient to prevent some relative movement between rubber bushes and metal parts. This causes very rapid wear of the bushes, which must therefore be replaced at frequent intervals, and at considerable expense.

SUMMARY OF THE INVENTION

The present invention has been devised with the general object of very materially reducing the said present disadvantage by providing a radius or rocker bush assembly which is particularly durable and trouble-free for long periods of use.

Accordingly, the invention resides broadly in a bush assembly for a radius rod or rocker arm, of the type in which there are engaged in an eye or annular member of the radius rod or rocker arm a pair of oppositely arranged resilient inner bushes tapering towards each other and mounted on a pair of tubular inner spacers on a fixed pin, means being provided for securing the pin, outwardly of the said inner bushes, in a bracket on a vehicle frame, wherein the inner spacers are freely rotatable on the fixed pin. The means for securing the pin in the bracket may consist of a pair of resilient outer bushes tapering towards each other, engaged in correspondingly tapered or coned apertures in the bracket, and firmly engaged on a pair of tubular outer spacers on the fixed pin. Each of the inner spacers may be releasably connected coaxially with the near outer spacer by a spigot of the one on the socket of the other without restricting relative rotation. Other features of the invention will become apparent from the following description.

BRIEF DESCRIPTION OF THE DRAWINGS

In order that preferred embodiments of the invention may be readily understood and carried into practical effect, reference is now made of the accompanying drawings, wherein.

DESCRIPTION OF THE PREFERRED EMBODIMENTS

Figure 1:
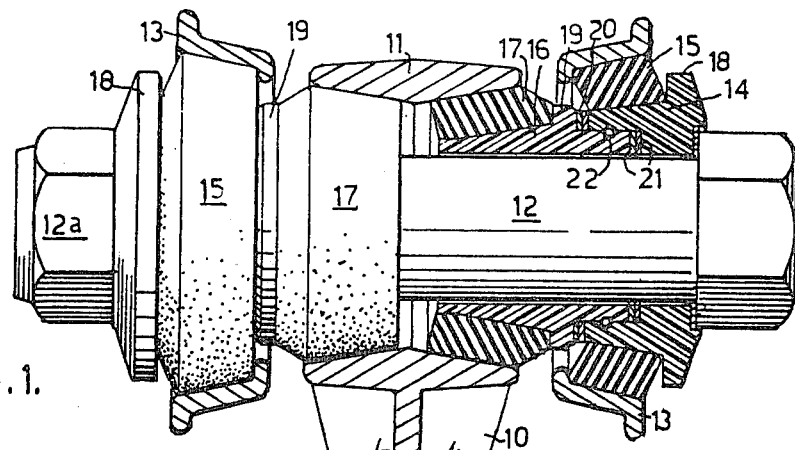
FIG. 1 is a partly sectioned plan view of a radius rod bush according to the invention.

Referring initially to FIG. 1, an oscillating radius rod, of which a part is shown at 10, has at its end an annular part or eye 11 which is bushed to a radius rod pin 12, which is a bolt engaged by a locking nut 12a. The pin is mounted in a fixed side member or bracket, parts of which are indicated at 13, this bracket being fixedly mounted on the vehicle chassis.

Engaged rotatably on the radius rod pin 13 are two oppositely arranged but otherwise similar assemblies, each including an outer spacer 14 carrying an outer bush 15, and an inner space 16 carrying an inner bush 17.

Both the outer spacer 14 and the inner spacer 16 are made of a tough low-friction plastic material. The outer spacer 14 has a frusto-conical body with an integral enlarged-diameter head 18 and an axial aperture of which the outer part is free fitting on the pin 12, the inner part being increased in diameter. The body of the inner spacer 16 has an intermediate peripheral flange 19 and an axial aperture to fit rotatably on the pin 12, the body, inwardly of this flange, being frusto-conical, and outwardly of the body being a cylindrical spigot to engage closely in the enlarged-diameter part or socket of the axial aperture of the outer spacer 14. Washers 20 are provided on the inner spacer body against the outer face of the flange 19, and washers 21 are fitted in the outer spacer 14 against the internal shoulder formed at the change of diameter of the axial aperture. The inner and outer spacers 14 and 16 are releasably interconnected by a circular clip 22 engaging in a peripheral groove about the outer part of the body of the inner spacer 16, and a registering peripheral groove within the enlarged-diameter part of the axial aperture of the outer spacer 14.

Each of the outer bushes 15 is an annular member of rubber or like material fitted closely on the frusto-conical body of an outer spacer 14, and the outer face of the bush is frusto-conical, tapering inwardly, to engage closely in a coned seating in the bracket 13.

Each of the inner bushes 17 is also of rubber or the like, closely fitted on the tapered inner part of the inner spacer 16, the main inner part of its exterior being frusto-conical for close engagement in a coned end part of the aperture through the eye 11 of the radius rod 10.

The tightening of the nut 12a on the pin 12 causes the two bush assemblies to be forced towards each other so the coned outer bushes 15 are forced firmly into the correspondingly shaped apertures of the bracket 13, and the coned inner bushes 17 are forced into the correspondingly shaped aperture through the eye 11 of the radius rod 10. The resilient bushes 15 and 17, then, are in compression and are firmly engaged frictionally with the spacers 14 and 16 and with the apertures in which they are compressed. However, as the inner spacers 16 are freely rotatable on the pin 12, and in relation to the outer spacers 14, there will be no likelihood of slipping friction between the resilient rubber or like bushes and the metal parts with which they are engaged, and therefore the bushes will not be subject to the rapid deterioration which occurs with conventional bushes, particularly when the vehicle is operated under rough conditions.

Figure 2:
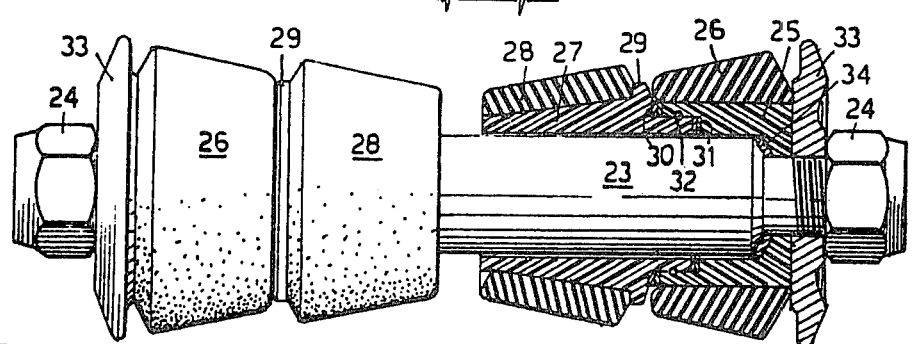
FIG. 2 is a partly sectioned plan view of a rocker arm bush according to a modification of the invention.

The rocker arm bush assembly shown in FIG. 2 includes a rocker arm pin 23 reduced in diameter and threaded at both ends for engagement by locking nuts 24. Rotatably mounted on the pin 23 are two oppositely arranged but otherwise similar assemblies each generally as before described with reference to FIG 1, having an outer spacer 25 for an outer bush 26, and an inner spacer 27 for an inner bush 28. Similarly to the assembly before described and shown in FIG. 1, the inner spacer 27 has a peripheral flange 29, and the outer end or spigot of this spacer is engaged in an enlarged-diameter part of the axial aperture or socket of the outer spacer 25, washers 20 and 31 being provided to resist axial thrust between the inter-fitted parts, which are releasably held together by a circular clip 32. This clip does not restrict relative rotational movement of the two interfitted spacers. Instead of the outer spacer 25 having a peripheral flange at its outer end, as in the embodiment shown in FIG. 1, there is provided instead a metal end disc 33 centrally apertured to accept the reduced end portion of the rocker arm pin 23. The outer end of the axial aperture of the outer spacer 25 is reduced to fit closely on the reduced end portion of the pin 23, and a washer 34 is engaged on this end portion of the pin, between the outer part of the outer spacer and the shoulder at the reduction in diameter of the pin 23.

The outer and inner bushes 26 and 28 are of rubber or like material, of substantially frusto-conical shape, the outer end of the outer bush bearing against the end disc 33, the outer end of the inner bush 28 bearing against the peripheral flange 29 of the inner spacer 27.

The two outer bushes 26 of the assembly are made to fit closely in coned openings in a bracket (not shown) on the vehicle chassis, the inner bushes 28 fitting closely in coned ends of an opening through one end of a rocker arm (not shown).

On the nuts 24 being tightened to engage the inner and outer bushes in the rocker arm and bracket, the outer spacers will be clamped and their rotation on the pin 23 restrained, but the inner spacers 27 will remain freely rotatable on the pin 23, and the destructive sliding friction between the bushes and the metal parts in which they are engaged will be obviated.

Figure 3:
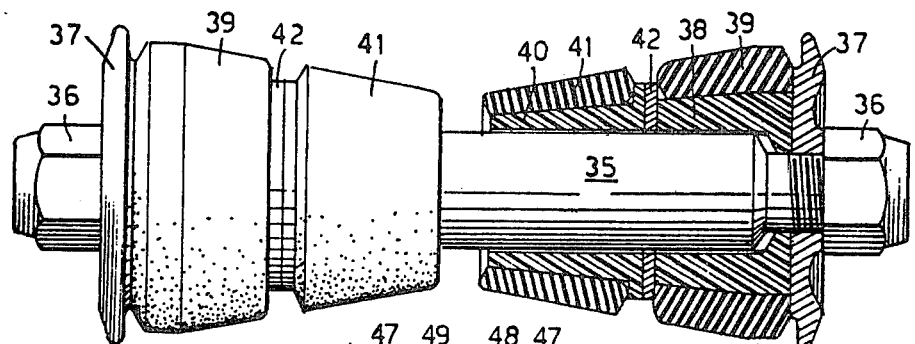
FIG. 3 is a partly sectioned plan view of a further form of a radius rod bush.

The radius rod bush shown in FIG. 3 is generally as above described with reference to FIG. 2, having a pin 35 with nuts 36 holding in place a pair of end discs 37 to retain on the pin a pair of assemblies each including an outer spacer 38 for an outer bush 39 and an inner spacer 40 for an inner bush 41. In this embodiment of the invention, however, the outer and inner spacers 38 and 40 are not interfitted and releasably held by a circular clip, as in the embodiments of FIGS. 1 and 2, but instead an annular washer 42 is interposed between the inner end of the outer spacer 38 and the flanged outer end of the inner spacer 40.

Figure 4:
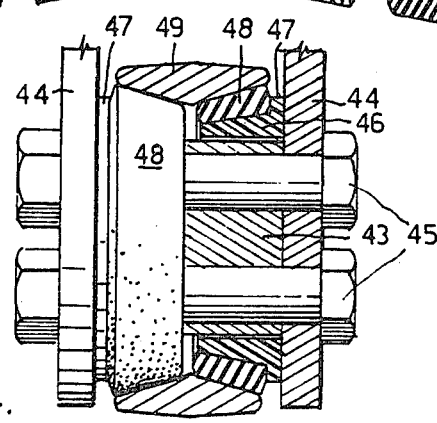
FIG. 4 is a partly sectioned elevation of another embodiment of a radius rod bush according to the invention.

The embodiment of the invention shown in FIG. 4 of the drawings is applicable to a radius rod or rocker arm of which the cylindrical pin 43, which is of short axial length and large diameter, is not bushed in brackets, but is fixedly secured between a pair of mounting plates 44 secured to and depending from a member of the vehicle chassis, two bolts 45 passing through holes in the plates and through registering parallel holes through the interposed pin 43. Rotatably mounted on the pin are a pair of similar oppositely arranged spacers 46 with inwardly tapering frusto-conical bodies and integral outer end flanges 47, a pair of rubber or like bushes 48 of frusto-conical shape being engaged on the tapered bodies of the two rotatable spacers 46, these bushes being closely fitted in the coned ends of the aperture through the annular member or eye 49 of a radius rod or rocker arm.

I claim:

1. A bearing for oscillatory motion including:
a pair of fixed side members,
coaxial coned apertures in said side members, tapering towards each other,
a pin passing through and spaced from said coned apertures in the side members,
an oscillatable member,
an eye on the oscillatable member, a passage through the eye being tapered from both ends and being about and spaced from the pin,
a pair of outer spacers on the pin,
a pair of resilient outer bushes engaged on the outer spacers and compressed between said outer spacers and the coned apertures of said fixed side members,
a pair of tubular inner spacers freely rotatable on the pin, inwardly of said outer spacers, and
a pair of resilient inner bushes engages on the inner spacers, each inner bush being compressed between the adjacent inner spacer and a tapered part of the passage through the eye of the oscillatable member,
wherein each inner spacer is releasably engaged coaxially with an adjacent outer spacer by a spigot and socket connection permitting relative rotational movement between the inner and outer spacers.

2. The bearing of claim 1 wherein washers are positioned between the confronting faces of said inner and outer spacers, and a circular clip positioned in registered peripheral grooves in the confronting spigot and socket connection areas of said inner and outer spacers.

3. The bearing of claim 2 wherein said outer spacers are formed with enlarged diameter outer end portions which engage the outermost surfaces of said outer bushes.

4. The bearing of claim 2 wherein the opposite ends of said pin are of reduced diameter, said outer spacers having reduced diameters to fit around said reduced diameter ends of said pin, and disc means positioned outwardly of said outer spacers and around said reduced diameter ends of said pin.

5. A bearing for oscillatory motion including:
a pair of fixed side members,
coaxial coned apertures in said side members, tapering towards each other,
a pin passing through and spaced from said coned apertures in the side members, the opposite ends of said pin being of reduced diameter and threaded,
an oscillatable member,
an eye on the oscillatable member, a passage through the eye being tapered from both ends and being about and spaced from the pin,
a pair of outer spacers on the pin, said outer spacers being formed with reduced diameter outer end portions which fit closely around said reduced opposite ends of said pin,
a pair of resilient outer bushes engaged on the outer spacers and compressed between said outer spacers and the coned apertures of said fixed side members, a pair of tubular inner spacers freely rotatable on the pin, inwardly of said outer spacers, a pair of resilient inner bushes engaged on the inner spacers, each inner bush being compressed between the adjacent inner spacer and a tapered part of the passage through the eye of the oscillatable member, washer means positioned around said pin and between said inner and outer spacers for spacing the same, disc means positioned outwardly of said outer spacers and around said reduced diameter ends of said pin, and nut means threaded on the opposite ends of said pin outwardly of said disc means, the tightening of said nuts serving to clamp said outer spacers on said pin without restraining the free rotation of said inner spacers on said pin.

* * * * *